US009479992B2

(12) United States Patent
Oh et al.

(10) Patent No.: US 9,479,992 B2
(45) Date of Patent: Oct. 25, 2016

(54) METHOD AND APPARATUS FOR CONTROLLING INTERFERENCE BASED ON CARRIER AGGREGATION FOR SMALL BASE STATION

(71) Applicant: Electronics and Telecommunications Research Institute, Daejeon-si (KR)

(72) Inventors: Sang Chul Oh, Daejeon-si (KR); Kyung Sook Kim, Daejeon-si (KR); Sung Hyun Moon, Seoul (KR); Seung Que Lee, Daejeon-si (KR); Young Jick Bahg, Daejeon-si (KR); Byung Han Ryu, Daejeon-si (KR); Nam Hoon Park, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 190 days.

(21) Appl. No.: 14/096,742

(22) Filed: Dec. 4, 2013

(65) Prior Publication Data

US 2015/0055629 A1 Feb. 26, 2015

(30) Foreign Application Priority Data

Aug. 22, 2013 (KR) ........................ 10-2013-0099740

(51) Int. Cl.
*H04W 36/30* (2009.01)
*H04W 36/00* (2009.01)
*H04L 5/00* (2006.01)

(52) U.S. Cl.
CPC ............ *H04W 36/30* (2013.01); *H04L 5/0098* (2013.01); *H04L 5/001* (2013.01); *H04W 36/0055* (2013.01)

(58) Field of Classification Search
CPC ............... H04W 36/30; H04W 48/20; H04W 72/0486; H04W 12/06; H04W 60/00; H04M 3/42

See application file for complete search history.

(56) References Cited

U.S. PATENT DOCUMENTS

| 2008/0267153 | A1* | 10/2008 | Mukherjee et al. | 370/338 |
| 2009/0209207 | A1 | 8/2009 | Halbauer et al. | |
| 2011/0034192 | A1* | 2/2011 | Lim et al. | 455/501 |
| 2014/0286264 | A1* | 9/2014 | Hirata | 370/329 |
| 2015/0036663 | A1* | 2/2015 | Kilpatrick et al. | 370/332 |

FOREIGN PATENT DOCUMENTS

| JP | 2008-136146 | 6/2008 |
| KR | 10-2010-0099414 | 9/2010 |
| KR | 10-2012-0085833 | 8/2012 |
| KR | 10-2012-0110841 | 10/2012 |
| WO | 2008/066109 A1 | 6/2008 |
| WO | 2011/047619 A1 | 4/2011 |

* cited by examiner

*Primary Examiner* — Anez Ebrahim
(74) *Attorney, Agent, or Firm* — Nelson Mullins Riley & Scarborough LLP

(57) ABSTRACT

A carrier aggregation-based interference control method and apparatus for small base stations are disclosed. The present invention comprises setting a primary component carrier (PCC) as a first carrier and setting a secondary component carrier (SCC) as a second carrier, monitoring a signal-to-interference plus noise ratio (SINR) of the first carrier or the second carrier, and determining whether the SINR of the first carrier is smaller than a predetermined threshold.

11 Claims, 6 Drawing Sheets

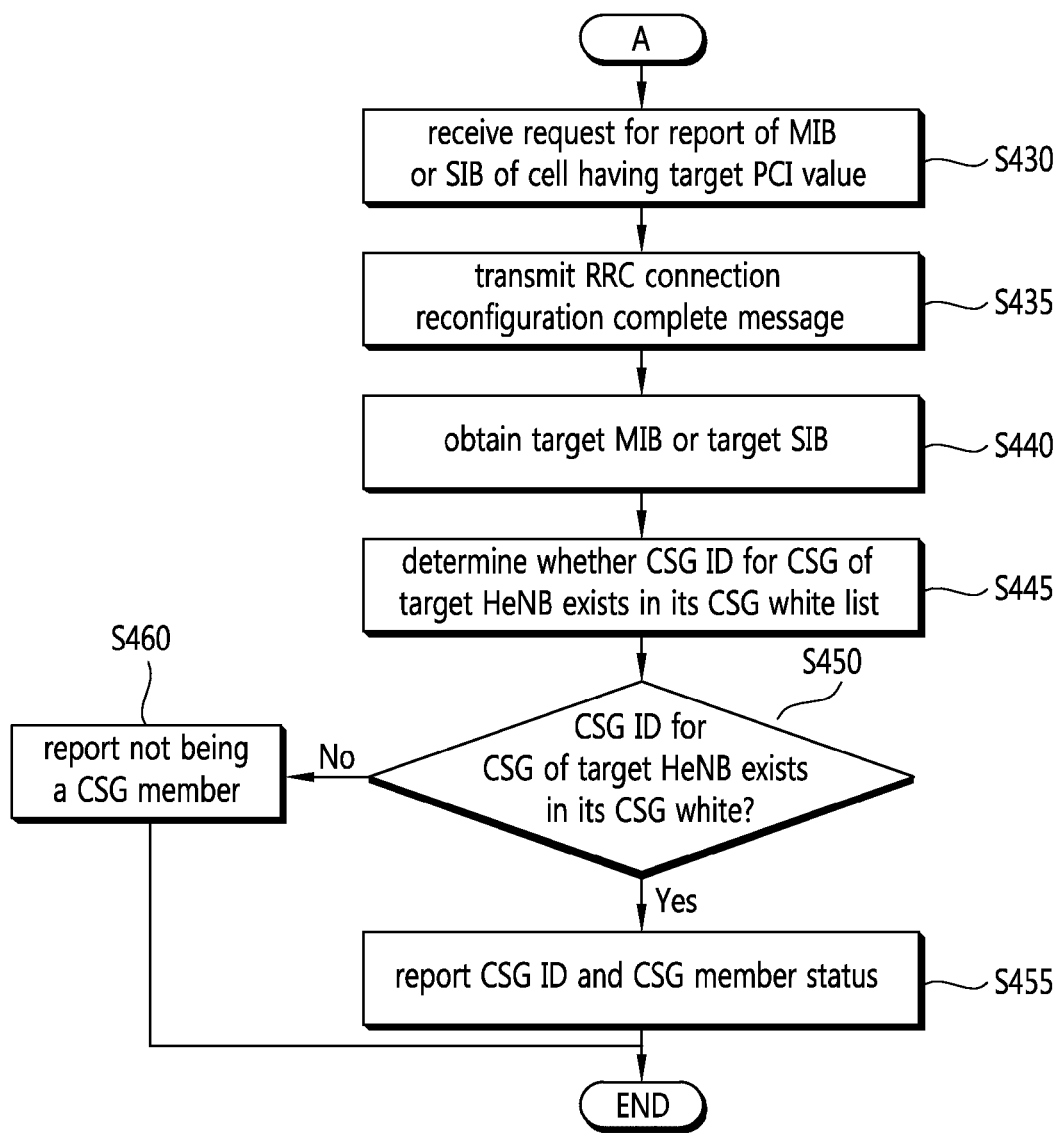

METHOD AND APPARATUS FOR CONTROLLING INTERFERENCE BASED ON CARRIER AGGREGATION FOR SMALL BASE STATION

This application claims priority to and the benefit of Korean patent application number 10-2013-0099740 filed on Aug. 22, 2013, the entire disclosure of which is incorporated by reference herein.

BACKGROUND OF THE INVENTION

1. Technical Field

The present invention relates to a wireless communication system, and more specifically, to a carrier aggregation technology for small base stations.

2. Discussion of Related Art

A home base station is installed in a small cell environment such as a building or home, and may be purchased, installed, and operated by a user. Accordingly, a number of home base stations may be installed and used in a macro base station regardless of a service provider's plan. This may cause a serious interference concern.

According to the current 3GPP standards, a CSG HeNB (Home evolved NodeB) or a hybrid HeNB having a CSG (Closed Subscriber Group) ID continues to broadcast its CSG indication information and CSG ID through system broadcast information. One CSG HeNB or hybrid HeNB is restricted as having one CSI ID.

In the case of CSG HeNBs, user terminal (UE) having a CSG function may gain access to a corresponding CSG HeNB only upon entry into a CSG HeNB cell region to which the UE subscribes. In contrast, when entering into a CSG HeNB cell region to which the UE does not subscribe, the UE cannot gain access to the CSG HeNB.

The information on the CSG to which the UE subscribes is stored in the SIM (Subscriber Identity Module) card of the UE in the form of a CSG white list. That is, for a service, the CSG ID number of the CSG HeNB is included in the CSG white list of the UE.

Meanwhile, in the case of hybrid HeNBs, when UE having a CSG function enters into a hybrid HeNB cell region to which the UE subscribes, the UE may access the hybrid HeNB and may have a priority in assignment of wired/wireless resources. On the contrary, when attempting to enter into an unsubscribed hybrid HeNB cell region, the UE may gain access thereto depending on availability of wired/wireless resources of the hybrid HeNB, but cannot have a priority for the wired/wireless resources.

Accordingly, in case the wired/wireless resources of the hybrid HeNB are insufficient, the UE might not access the hybrid HeNB, or even succeeding in the access, the UE may be kicked out while on service.

Further, the information on the CSG to which the UE subscribes is stored in the SIM card of the UE in the form of a CSG white list, so that the CSG ID number of the hybrid HeNB is included in the CSG white list for a service.

A plurality of component carriers may be aggregated and used. At this time, a circumstance may occur where a macro eNB and a home eNB co-exist, i.e., a situation where a macro eNB and a CSG home eNB share the same frequency.

A need exist for a method or apparatus of controlling interference that may be caused when the same frequency is shared in such carrier aggregation circumstance.

SUMMARY OF THE INVENTION

An object of the present invention is to provide a method and apparatus of controlling interference in a carrier aggregation circumstance.

Another object of the present invention is to provide a method and apparatus of avoiding interference to a non-CSG macro UE in a carrier aggregation circumstance.

Still another object of the present invention is to provide a method and apparatus of reconfiguring a primary carrier or varying an operation mode for component carriers in which interference occurs.

According to an aspect of the present invention, a method of controlling interference in a base station comprises setting a primary component carrier (PCC) as a first carrier and setting a secondary component carrier (SCC) as a second carrier, monitoring a signal-to-interference plus noise ratio (SINR) of the first carrier or the second carrier, determining whether the SINR of the first carrier is smaller than a predetermined threshold, if the SINR of the first carrier is smaller than the predetermined threshold, releasing the first carrier from the PCC and changing the second carrier to the PCC through handover, and changing a mode of the first carrier to a hybrid mode or an open mode.

According to another aspect of the present invention, a method of transmitting control information for controlling interference by a UE comprises receiving a request for a PCI value of a neighbor cell from a base station through an RRC connection reconfiguration message, monitoring whether there is a strong signal output from the neighbor cell, if there is the strong signal output from the neighbor cell, obtaining a PCI value of the neighbor cell from a sync channel of the neighbor cell, transmitting a measurement report message including the PCI value of the neighbor cell to the base station, receiving a request for system broadcast information of the neighbor cell from the base station, receiving the system broadcast information of the neighbor cell through a BCCH, obtaining a per-CC CSG ID of the neighbor cell based on the system broadcast information, determining whether the per-CC CSG ID of the neighbor cell is present in a CSG white list of the UE, and if the per-CC CSG ID of the neighbor cell is present in the CSG white list of the UE, transmitting a measurement report including the per-CC CSG ID of the neighbor cell and CSG member status information to the base station.

According to the present invention, interference that occurs in a component carrier may be avoided, thus enhancing the overall system performance.

BRIEF DESCRIPTION OF THE DRAWINGS

FIGS. 4A and 4B illustrate an example of a measurement report procedure of a UE according to the present invention.

DESCRIPTION OF EMBODIMENTS

Exemplary embodiments of the present invention will be described in detail with reference to the accompanying drawings so that the present invention may be easily implemented by those of ordinary skill in the art. However, the present invention may be realized in various forms, and is not limited to the exemplary embodiments described below. Further, what is not related to the present invention is omitted from the drawings so as to thoroughly disclose the present invention. The same or similar denotations are used to refer to the same or similar elements throughout the drawings.

Objects and effects of the present invention may be naturally understood or become more apparent from the following description of the present invention, but the objects and effects of the present invention are not limited thereto.

Objects, features, and advantages of the present invention will be apparent from the detailed description that follows. Further, when determined to make the subject matter of the present invention unnecessarily unclear, the detailed description of the known prior art relating to the present invention is skipped. Hereinafter, exemplary embodiments of the present invention will be described with reference to the accompanying drawings.

A home eNB (HeNB) may be installed in a small cell environment such as the inside of a home or a building and has relatively narrow coverage. Hereinafter, it is referred to as "HeNB."

A macro eNB is a large base station and has relatively broad coverage. Hereinafter, it is referred to as "eNB."

The HeNB may be installed in a space which is not covered by the eNB—this space is referred to as a "coverage hole"—or may be installed in a space with a lot of demand for telecommunication—this space is referred to as a "hot spot." In particular, due to HeNBs installed in a hot spot, interference is highly likely to occur.

Figure 1:
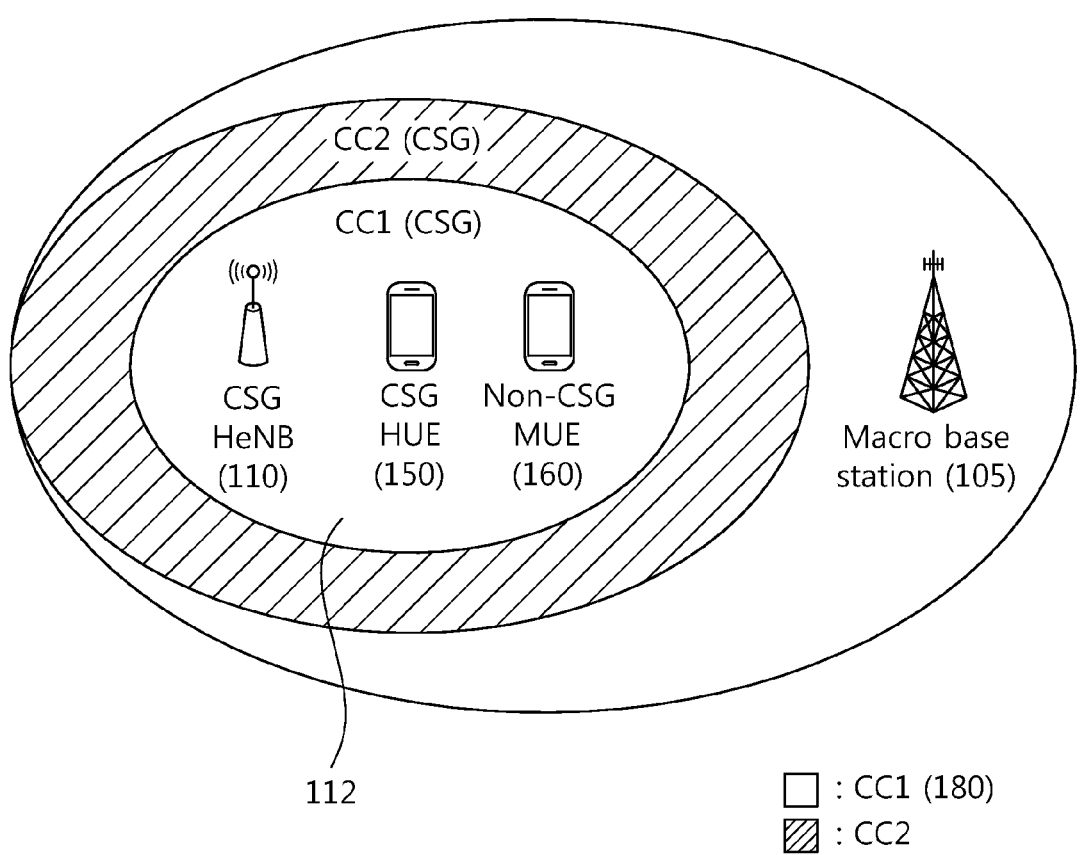
FIG. 1 illustrates an example of a wireless communication environment to which the present invention is applied.

FIG. 1 illustrates an example of a wireless communication environment to which the present invention is applied. FIG. 1 shows an example in which interference occurs between an eNB and a HeNB in a carrier aggregation-based communication.

Referring to FIG. 1, user equipments (UEs) 150 and 160 connected to a macro eNB 105 via a first carrier CC1 180 communicate with a CSG home evolved NodeB (HeNB) 110.

The UEs include a CSG HUE 150 and a non-CSG MUE 160.

The CSG HUE 150 is a home UE (HUE) which is a CSG member, and is a UE that communicates with the HeNB under the circumstance where it subscribes to the CSG.

The macro UE (MUE) that is not a CSG member, i.e., the non-CSG MUE 160, is a UE that communicates with the eNB under the circumstance where it does not subscribe to the CSG. In case the non-CSG MUE 160 enters into a CSG HeNB CC1 region to which the non-CSG MUE 160 does not subscribe, serious interference may occur.

In case the CSG HUE 150 enters into the HeNB region 112 using the CC1 180, since the HeNB 110 is an HeNB to which the CSG HUE 150 itself subscribes, a normal inbound handover occurs, and the CSG HUE 150 accesses the HeNB 110. In this case, the possibility that interference occurs is low.

In contrast, since the non-CSG MUE 160 does not subscribe to the HeNB 110 to which it enters, it may not access the HeNB 110 and continues to communicate with the macro eNB 105 through the CC1 180. At this time, serious interference may occur.

Such interference may affect other UEs communicating with the ambient HeNB as well as the corresponding UE, and a communication drop may occur.

Hereinafter, a method and apparatus of controlling interference in a carrier aggregation circumstance according to the present invention are described.

It is assumed that the HeNB is operated in a first carrier (CC1) that is a primary component carrier (PCC) and a CC2 that is a secondary component carrier (SCC) and that the CC1 is shared with a macro eNB. The present invention is not limited thereto, and the present invention may also apply to any other circumstances where interference occurs in a carrier aggregation situation.

Figure 2:
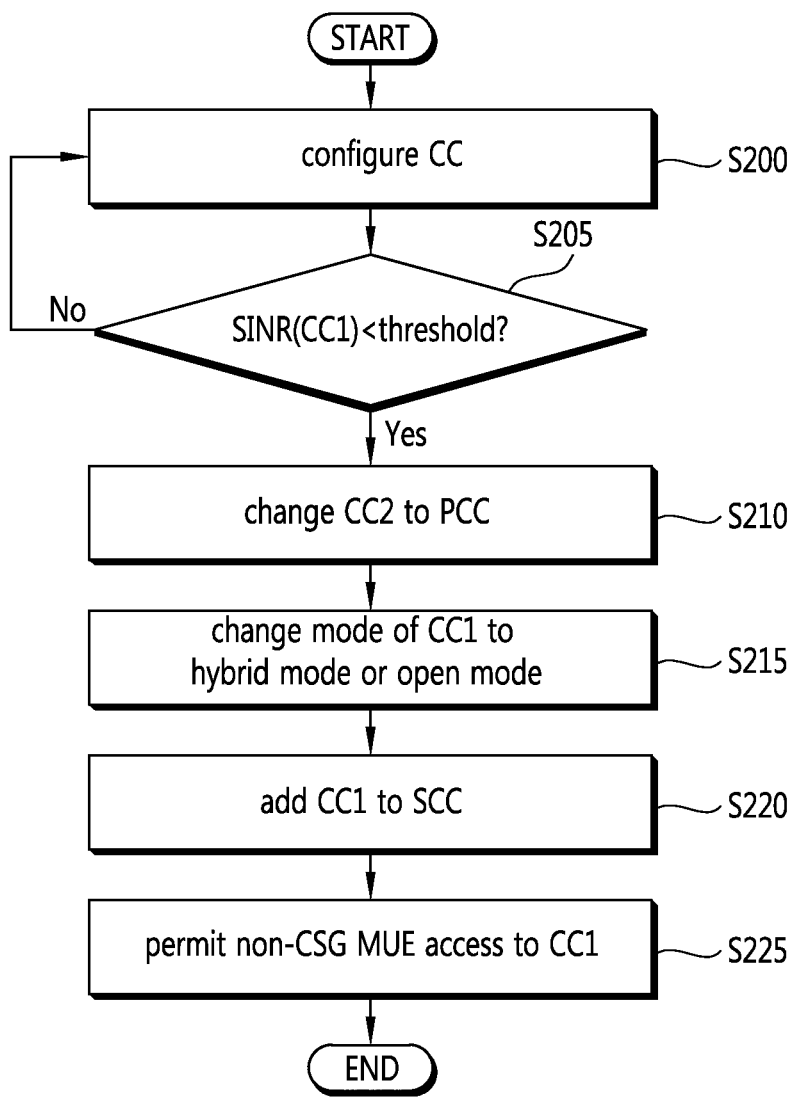
FIG. 2 is a flowchart illustrating an example of a method of controlling interference in a carrier aggregation circumstance.

FIG. 2 is a flowchart illustrating an example of a method of controlling interference in a carrier aggregation circumstance. It is assumed that while a UE operates, the mode of the HeNB (e.g., open mode, CSG mode, or hybrid mode) may be changed.

Referring to FIG. 2, if a predetermined level or higher of interference occurs while the UE operates (for example, if interference of a predetermined threshold or more is sensed), the UE may change the HeNB mode for a CC in which interference occurs from the CSG mode to the hybrid mode.

In the HeNB, the PCC is set as the CC1, and the SCC is set as the CC2 (S200). It is assumed that while the CSG HUE receives a service through the PCC and the SCC from the HeNB, a non-CSG MUE enters into the CC1 region so that interference occurs in the CC1.

The HeNB monitors the SINR (Signal-to-Interference plus Noise Ratio) of each of the CC1 and CC2 where the corresponding UE is in service to determine whether the SINR of the CC1 is smaller than a predetermined threshold (S205). The SINR may be calculated by the following equation:

$$\text{SINR} = P/(I+N) \qquad \text{[Equation 1]}$$

Here, P is signal power, I is interference power, and N is noise power.

If in step S205 the SINR of the CC1 is equal to or larger than the predetermined threshold, interference is determined to be ignorable, and an initial operation is performed. By way of example, the HeNB may reconfigure the CC.

If in step S205 the SINR of the CC1 is smaller than the predetermined threshold, the HeNB releases the CC1 on PCC and changes the CC2 to a new PCC through handover (S210).

At this time, after the CC2 is set to the PCC through handover, the existing SCCs may be released and then the SCC may be reconfigured to new CCs.

Subsequent to step S210, the HeNB changes the mode of the CC1 from the CSG mode to the hybrid mode or open mode so that the non-CSG MUE may access the CC1 (S215).

Then, the HeNB adds the CC1 as the SCC for the CSG HUE (S220).

Thereafter, the HeNB permits non-CSG MUE access to the CC1 so that the non-CSG UE may access the CC1 through inbound handover (S225). At this time, the CC1 is an SCC for the CSG HUE, but a PCC for the non-CSG MUE.

Figure 3:
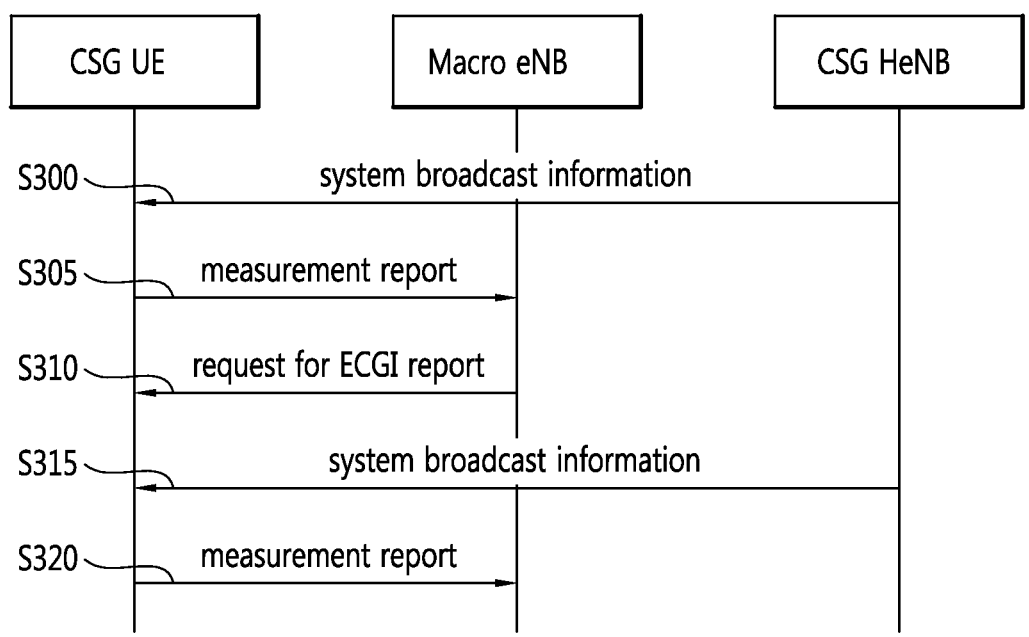
FIG. 3 illustrates an example of an ANR (Automatic Neighbor Relation) procedure of an eNB according to the present invention.

FIG. 3 illustrates an example of an ANR (Automatic Neighbor Relation) procedure of an eNB according to the present invention. The ANR refers to the eNB managing information on a neighbor eNB in the form of an NRT (Neighbor Relation Table). If a new neighbor eNB is discovered, information thereon may be added to the NRT table or the eNB that is not a neighbor eNB any longer may be removed from the NRT table.

The following circumstance is assumed: the UE is a CSG UE that is a CSG member and receives services through a CC1 with a CSG ID of 7 and a CC2 with a CSG ID of 10. The macro eNB transmits services through cell A with a PCI (Physical Cell ID) of 3 and an ECGI (E-UTRAN Cell Global Identifier) of 17. The CSG HeNB transmits services through a CC1 with a CSI ID of 7 and a CSI ID of 10 in cell B with a PCI of 5 and an ECGI of 19.

Referring to FIG. 3, the HeNB broadcasts system broadcast information (e.g., MIB (Master Information Block) or SIB (System Information Block)) through a BCCH (Broadcast Control Channel) (S300). The system information includes PCI information that is at a model level.

The system broadcast information may include a CSI ID of each CC. Further, the system broadcast information may be continuously broadcast.

The SIM card of the CSG UE may include a CSG white list. At this time, the CSG white list of the CSG UE may be set as 'CC1(CSG ID=7), CC2(CSG ID=10)'.

If the macro eNB sends a request for a measurement report for a neighbor cell to the CSG UE, and the CSG UE that has discovered the neighbor cell sends the measurement report to the macro eNB (S305).

The measurement report may include a PCI value (e.g., PCI=5) of the neighbor cell.

The measurement report may include a result of having monitored whether there is a neighbor cell that sends out a strong signal.

Subsequently, the eNB requests the CSG UE to report an ECGI value (S310). At this time, the requested ECGI may be an ECGI value for cell B of the CSG HeNB (e.g., an ECGI value in case the target PCI is 5).

The CSG UE receives system information through a BCCH channel of the CSG HeNB (S315). Based on the BCCH, the CSG UE may read or decode the system broadcast information (e.g., MIB or SIB information) and may verify whether the system broadcast information is consistent with the CC1 (e.g., CSG ID=7) and CC2 (e.g., CSG ID=10) included in the CSG white list in the SIM card of the CSG UE itself. That is, the CSG UE may identify whether it is a member of the CSG HeNB.

By way of example, the system broadcast information (e.g., MIB or SIB) transmitted through the BCCH may include the CSG ID of the CC1, ECGI that is an upper level and the CSG ID of the CC2.

In other words, the system broadcast information may include the ECGI (e.g., ECGI=19) of cell B, CC1 (e.g., CSG ID=7), or CC2 (e.g., CSG ID=10).

If per-CC CSG ID of the target cell exists in the CSG white list of the CSG UE, the CSG UE transmits a measurement report including the per-CC CSG ID of the target cell and CSG member status information to the macro eNB (S320).

The measurement report may include information of the ECGI (e.g., ECGI=19) of cell B, CC1 (e.g., CSG ID=7), or CC2 (e.g., CSG ID=10).

Unless the per-CC CSG ID of the target cell exists in the CSG white list of the CSG UE, the CSG UE transmits a measurement report including information indicating being not a member in the 'CSG member status' to the macro eNB (S320). The information may be a one-bit indicator, and may include TRUE or FALSE.

Figure 4A:
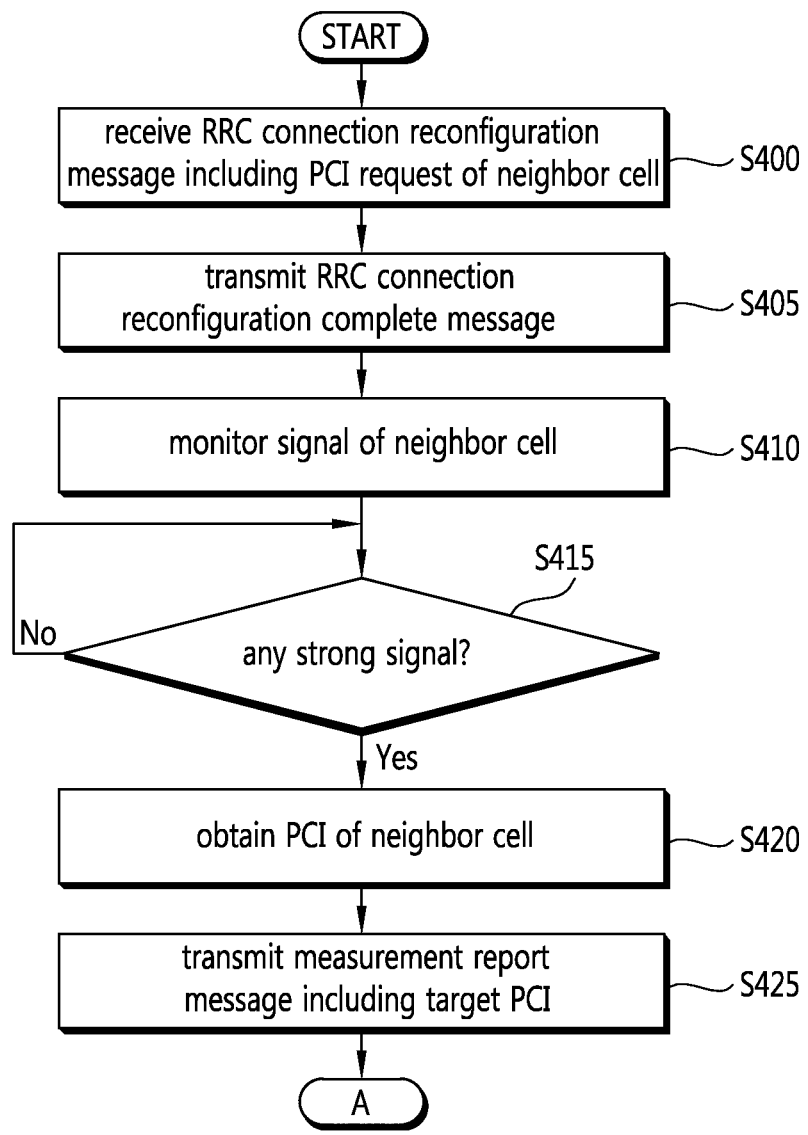

FIGS. 4A and 4B illustrate an example of a measurement report procedure of a UE according to the present invention. The UE may be a CSG UE that transmits a measurement report to an eNB that performs an ANR according to the present invention as shown in FIG. 3.

Referring to FIGS. 4A and 4B, the UE receives a request for a PCI value of a neighbor cell from the eNB through an RRC connection reconfiguration message (S400).

The UE may respond by sending an RRC connection reconfiguration complete message to the eNB (S405).

The UE monitors whether there is a strong signal that is output from a neighbor cell (S410).

If a neighbor cell exists where there is a strong signal (S415), the UE obtains a target PCI (Physical Cell ID) value from the sync channel of the neighbor cell (S420). That is, the target PCI refers to a PCI of the neighbor cell.

The UE transmits a measurement report message including the target PCI to the eNB (S425).

The UE receives from the eNB a request for MIB or SIB information (this is referred to as a target MIB or target SIB) of the cell having the corresponding target PCI value through the RRC connection reconfiguration message (S430). At this time, the RRC connection reconfiguration message may include gap information that is required for the UE to read the target MIB or target SIB information.

The UE may respond by transmitting an RRC connection reconfiguration complete message (S435).

The UE obtains the target MIB or target SIB information by receiving the BCCH of the target HeNB (S440). Here, the target HeNB refers to a cell having a target PCI value, and the target MIB or target SIB refers to the MIB or SIB of the target HeNB.

The UE obtains a per-CC CSG ID of the target HeNB from the obtained target MIB or target SIB information and determines whether the per-CC CSG ID of the target HeNB is present in the CSG white list of its SIM card (S445). This is referred to as a primary access control procedure.

In case the per-CC CSG ID of the target HeNB is present in the CSG white list of the SIM card (S450), a measurement report including the CSG member status information and the corresponding per-CC CSG ID is transmitted to the eNB (S455).

In case the per-CC CSG ID of the target HeNB is not present in the CSG white list of the SIM card (S450), the UE includes information indicating being not a member in the CSG member status and transmits it to the eNB (S460).

Figure 5:
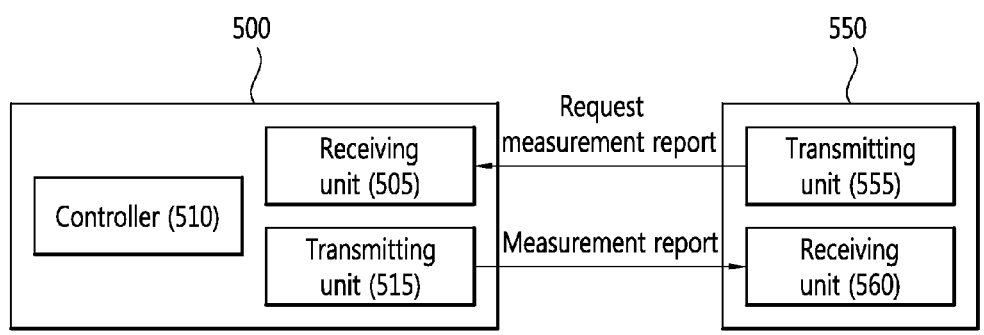
FIG. 5 is a block diagram illustrating an apparatus of controlling interference according to the present invention.

FIG. 5 is a block diagram illustrating an apparatus of controlling interference according to the present invention.

Referring to FIG. 5, the UE 500 includes a receiving unit 505, a controller 510, or a transmitting unit 515.

The receiving unit 505 may receive system broadcast information (e.g., MIB or SIB) of an eNB (HeNB or macro eNB 550) through a BCCH. The system broadcast information may include a CSI ID of each CC. Further, the receiving unit 505 may continue to receive the system broadcast information by a number of times.

The receiving unit 505 receives a request for a measurement report for a neighbor cell from the macro eNB 550.

When discovering the neighbor cell, the transmitting unit transmits the measurement report to the macro eNB 550. The measurement report may include a PCI value of the neighbor cell. Or, the measurement report may include a result of having monitored whether there is a neighbor cell that sends out a strong signal.

The receiving unit 505 receives a request for an ECGI value of the neighbor cell from the macro eNB 550.

The receiving unit 505 receives system broadcast information (e.g., MIB or SIB information) from a HeNB through a BCCH channel.

Based on the BCCH, the controller 510 verifies whether the system broadcast information is consistent with the CSG ID included in the CSG white list of the UE 500. That is, the controller 510 verifies whether the UE 500 is a member of the CSG HeNB for each CC. By way of example the system broadcast information (e.g., MIB or SIB) may include an ECGI of the target cell (i.e., HeNB 550), CSG ID of the CC1, and CSG ID of the CC2.

If the per-CC CSG ID of the target cell is present in the CSG white list of the UE 500, the transmitting unit transmits a measurement report including the per-CC CSG ID of the target cell and the CSG member status information to the macro eNB 550. The measurement report may include the ECGI of the target cell and the CSG ID of the CC1 or CC2.

If the per-CC CSG ID of the target cell is not present in the CSG white list of the UE 500, the transmitting unit 515 transmits a measurement report including information indicating being not a member in the 'CSG member status' to the macro eNB 550. The information may be a one-bit indicator, and may include TRUE or FALSE.

The macro eNB 550 includes a transmitting unit 555 or a receiving unit 560.

The transmitting unit 555 transmits a request for a measurement report for a neighbor cell to the UE 500.

The receiving unit 560 receives a measurement report for the neighbor cell from the UE 500. The measurement report may include the PCI value of the neighbor cell. Or, the measurement report may include a result of having monitored whether there is a neighbor cell that sends out a strong signal.

The transmitting unit 555 transmits a request for an ECGI value of the neighbor cell to the UE 500.

The receiving unit 560 receives the measurement report including a result of having identified whether the UE 500 is a member of the CSG HeNB from the UE 500.

By way of example, the measurement report may include a per-CC CSG ID of the target cell and CSG member status information. Or, the measurement report may include an ECGI of the target cell and the CSG ID of the CC1 or CC2.

As another example, the measurement report may include information indicating being not a member in the 'CSG member status'. The information may be a one-bit indicator and may include TRUE or FALSE.

As another example, the home base station includes a controller or a monitoring unit (not shown in the drawings).

The controller initially sets the PCC as the CC1 and sets the SCC as the CC2.

The monitoring unit monitors the SINR of the CC1 and CC2.

The controller determines whether the SINR of the monitored CC is smaller than a predetermined threshold.

If the SINR of the CC1 is equal to or larger than the predetermined threshold, interference may be determined to be ignorable, so that the controller may reconfigure the CC.

If the SINR of the CC1 is smaller than the predetermined threshold, the controller releases the CC1 from the PCC and changes the CC2 to a new PCC through handover. At this time, the controller releases the existing SCCs and may reconfigure the SCCs as new CCs.

The controller changes the mode of the CC1 from the CSG mode to the hybrid mode or open mode so that the non-CSG MUE may access the CC1.

The controller adds the CC1 as the SCC for the CSG HUE.

The controller permits non-CSG MUE access to the CC1 so that the non-CSG MUE may gain access to the CC1 through inbound handover. At this time, the CC1 is the SCC for the CSG HUE, but may be the PCC for the non-CSG MUE.

It will be understood by those skilled in the art that various changes may be made to the present invention without departing from the scope of the present invention, and accordingly, the present invention is not limited to the above-described embodiments and the accompanying drawings.

In the above-exemplified systems, although the methods are described based on the flowcharts having a series of steps or blocks, the present invention is not limited to the order of the steps. Rather, some steps may be performed concurrently with or in a different order from other steps. Further, it will be understood by those skilled in the art that other steps may be included in the flowcharts or some of the steps of the flowcharts may be excluded without affecting the scope of the present invention.

What is claimed is:

1. A method of controlling interference for a closed subscriber group (CSG) base station in a macro base station, the method comprising:
   setting a primary component carrier (PCC) as a first carrier and setting a secondary component carrier (SCC) as a second carrier;
   monitoring a signal-to-interference plus noise ratio (SINR) of the first carrier or the second carrier;
   determining whether the SINR of the first carrier is smaller than a predetermined threshold;
   if the SINR of the first carrier is smaller than the predetermined threshold, releasing the first carrier from the PCC and changing the second carrier to the PCC through handover; and
   changing a mode of the first carrier to a hybrid mode or an open mode, releasing existing SCCs and reconfiguring the SCC with new component carriers (CCs), adding the first carrier as the SCC and permitting macro user equipment (UE) that is a non-closed subscriber group member to access the first carrier after the first carrier has been released from the PCC,
   wherein the PCC is shared with the macro base station.

2. The method of claim 1, further comprising, if the SINR of the first carrier is equal to or larger than the predetermined threshold, disregarding the interference.

3. The method of claim 1, further comprising releasing the SCCs and reconfiguring the SCC with new CCs.

4. The method of claim 3, further comprising adding the first carrier as the SCC.

5. The method of claim 1, further comprising permitting a macro UE that is a non-closed subscriber group (CSG) member to access the first carrier.

6. A method of transmitting control information for controlling interference by a UE, the method comprising:
   receiving a request for a physical cell ID (PCI) value of a neighbor cell from a base station through an RRC connection reconfiguration message;
   monitoring whether there is a strong signal output from the neighbor cell;
   if there is the strong signal output from the neighbor cell, obtaining a PCI value of the neighbor cell from a sync channel of the neighbor cell;
   transmitting a measurement report message including the PCI value of the neighbor cell to the base station;
   receiving a request for system broadcast information of the neighbor cell from the base station;
   receiving the system broadcast information of the neighbor cell through a broadcast control channel (BCCH);
   obtaining a per-component carrier (CC) Closed Subscriber Group (CSG) ID of the neighbor cell based on the system broadcast information;

determining whether the per-CC CSG ID of the neighbor cell is present in a CSG white list of the UE; and if the per-CC CSG ID of the neighbor cell is present in the CSG white list of the UE, transmitting a measurement report including the per-CC CSG ID of the neighbor cell and CSG member status information to the base station, wherein the measurement report comprises a result of whether the neighbor cell has a strong signal output; and if the per-CC CSG ID of the neighbor cell is not present in the CSG white list on the UE, transmitting the measurement report to the base station indicating that the UE is not a member of the per-CC CSG of the neighbor cell.

7. The method of claim 6, wherein the request for the system broadcast information further includes gap information that is required for the UE to read the system broadcast information.

8. The method of claim 6, further comprising responding to the RRC connection reconfiguration message by transmitting an RRC connection reconfiguration complete message.

9. The method of claim 6, wherein the CSG white list is included in an subscriber identity module (SIM) card.

10. The method of claim 6, further comprising, in a case where the per-CC CSG ID of the neighbor cell is not present in the CSG white list, transmitting information indicating that the UE is not a CSG member to the base station.

11. The method of claim 10, wherein the information indicating that the UE is not the CSG member is a one-bit indicator and includes one of TRUE or FALSE.

* * * * *